UNITED STATES PATENT OFFICE.

HENRY WARDEN, OF HANNIBAL, MISSOURI.

PROCESS FOR PRESERVING MEATS.

SPECIFICATION forming part of Letters Patent No. 226,136, dated March 30, 1880.

Application filed October 17, 1879.

*To all whom it may concern:*

Be it known that I, HENRY WARDEN, of Hannibal, Missouri, formerly of Philadelphia, Pennsylvania, have invented a new and useful Improvement in Processes of Coloring Meat, of which the following is a full, clear, and true description.

My invention relates to meat curing and coloring processes heretofore in use, in which fluids embodying flavoring and coloring agents have been injected into the carcass to be cured and colored, so as to displace the blood and replace it; and it consists substantially in supplementing such processes by replacing in turn the fluids heretofore employed, after they have remained a suitable length of time in the carcass, by atmospheric air, oxygen, or oxidizing gases.

Heretofore in the attempted coloring of the carcasses of cattle and the like by processes of injection of flavoring and coloring liquids, in order for the most perfect results as to the coloring of the meat, it has been found necessary, in addition to the injection of the liquid, to subsequently quarter the carcass and immerse the quartered portions in tanks of pickling-liquids, and continue the immersion for a period of many (and usually of about twenty) days, at the end of which period only has the meat become of the proper red color.

When liquid injection has been alone employed the results have not been satisfactory, and the carcass has not, moreover, been at all colored.

I have discovered that by supplementing the injection of curing and coloring liquid by an injection of atmospheric air, oxygen, or oxidizing-gases the result has been that the carcass has become of the proper redness in about twenty-five minutes—has been, in fact; so perfectly colored that it can be quartered, preserved by cooking or otherwise, and packed in cans within twenty-four hours of the time of killing.

I prefer to apply the air or gas hot or in a slightly-heated condition, as in such case I find that I obtain the best practical results. I do not, however, confine myself to any specified temperature.

I apply the injection of air in the same manner that liquids have been heretofore injected —that is to say, by the application of a force-pump or the like to the aorta.

I find a convenient practice to be to first lay the carcass open, so as to expose the heart, to apply the injecting apparatus to the aorta, and to effect an escape-opening in the vena cava. Cold, blood-warm, or hot pickle, or pickle at any desired temperature is then forced in under pressure, so as to (as nearly as possible) expel the blood from the entire venous and arterial system by the opening first effected. When the pickling-liquid runs clear the blood is to every practical purpose expelled. I then continue to inject in the same manner, but substitute air or oxygen gas for the pickling-liquid.

When the liquid is expelled, and after a period of about twenty-five minutes of injection, the carcass can be skinned, gutted, and quartered, and is ready to be preserved by cooking or other method, and packed in cans, the entire process being completed within twenty-four hours, inasmuch as the red color is obtained upon even the interior surfaces within twenty-five minutes after the injection of air.

It is, of course, immaterial to my process as to the character of the pickling-liquid employed, provided it be of the character usually employed in processes of curing meats, and provided, also, that it be not so salt or otherwise strong as to exert an antiseptic influence, as in such case it renders the meat too salt to rank with the best canned corned beef of commerce, which requires to be merely flavored and not over salt, and inasmuch as all antiseptic results are attained in and by the subsequent preserving processes.

I am aware that the following process is old in the art of embalming, viz: first, to prepare the tissues of a cadaver and remove the fat by injections alternately of alcohol and of water, or of ether and water; second, to tan the tissues by injections of tannic acid; and third, to desiccate the tissues by means of heated air applied externally and internally, artificial coloring-matter being, when desired, resorted to by the introduction of suitable coloring-matter after the tanning; and to any such process I lay no claim.

Having thus described my invention, I claim and desire to secure by Letters Patent of the United States—

The method herein described of effecting rapid and artificial coloring of meat to be preserved, which consists in injecting pickling-fluid into the circulatory system of a carcass, so as to practically expel and replace the blood, and in then, in the same manner, injecting atmospheric air, oxygen, or an oxidizing-gas, so as to expel and replace the pickling-fluid, substantially as described.

In testimony whereof I have hereunto signed my name this 6th day of October, A. D. 1879.

HENRY WARDEN.

In presence of—
ARTHUR T. WARNER,
PHILIP H. KNIGHTON.